June 22, 1943.                M. KALISCHER                2,322,714
                        REFRIGERATING APPARATUS
                         Filed Nov. 15, 1940
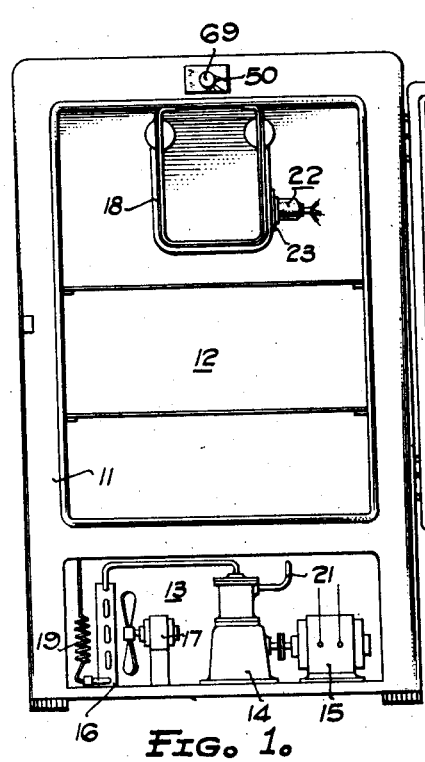
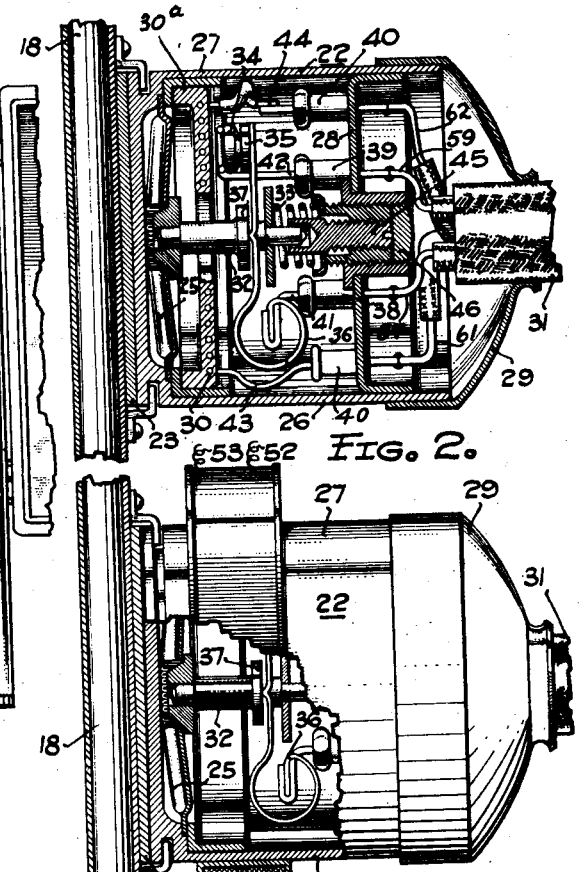
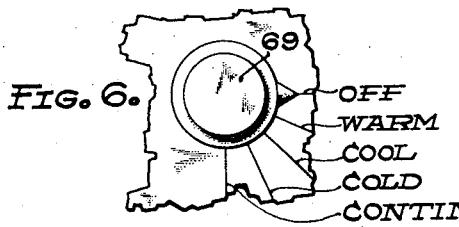
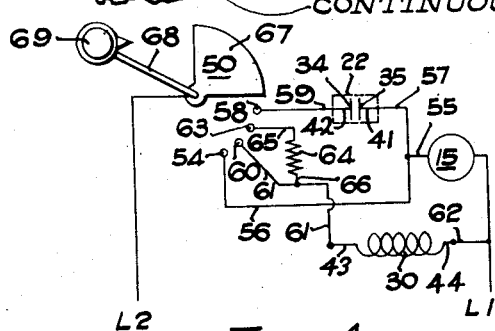
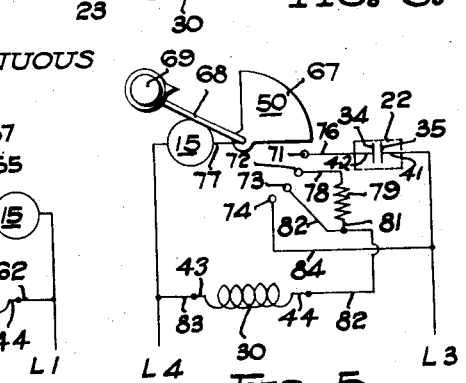
INVENTOR
MILTON KALISCHER
BY
ATTORNEY Patented June 22, 1943

2,322,714

UNITED STATES PATENT OFFICE 2,322,714

REFRIGERATING APPARATUS

Milton Kalischer, Longmeadow, Mass., assignor to Westinghouse Electric & Manufacturing Company, East Pittsburgh, Pa., a corporation of Pennsylvania Application November 15, 1940, Serial No. 365,822

10 Claims. (Cl. 62—4)

This application is filed in the place of and repeats the disclosure presented by my application, Serial No. 260,503, filed March 8, 1939. My invention relates to refrigeration apparatus of the temperature-responsive metal type for controlling the operation of mechanical refrigerators.

The phrase "temperature-responsive-metal type" describes a control wherein the energizing member is formed of a metal or plurality of metals which flex as heat is applied to them, preferably in a snap-acting manner, such as the well-known bimetal thermostat, as distinguished from a bellows, diaphragm or Bourdon tube, wherein a fluid expands or contracts in a flexible metal container. Heretofore, thermostats of the temperature-responsive-metal type have been used primarily in applications where relatively high temperatures prevailed, such as in electric water heaters, irons and the like. However, recently, thermostatic elements of this type have been developed so that they are suitable for low temperature control apparatus, such as, for example, mechanical refrigerator temperature control.

It is, therefore, an object of my invention to provide improved temperature control apparatus for mechanical refrigerators of the type wherein the thermostatic element is formed of temperature-responsive metal.

It is another object of my invention to provide improved adjustable temperature control apparatus of the temperature-responsive-metal type.

It is still another object of my invention to provide temperature control apparatus of the temperature-responsive-metal type which compensates for variations in ambient temperatures surrounding the refrigerator cabinet and/or the evaporator to maintain a constant air temperature in the cabinet.

It is a further object of my invention to provide an improved hermetically-sealed refrigerator control of the temperature-responsive-metal type.

It is still a further object of my invention to provide an improved adjustment for a control of the temperature-responsive-metal type which adjustment is operated by a single manually operated member to effect continuous operation of the refrigerator, to render it completely inactive, or to obtain cyclic operation to maintain a predetermined mean evaporator temperature.

It is another object of my invention to so arrange control apparatus of the temperature-responsive-metal type, which has an electrical heater associated therewith for adjustment, that both the upper and lower temperature limits of the control apparatus may be appreciably varied and so that relatively small quantities of heat will effect the desired adjustment or compensation.

These and other objects are effected by my invention as will be apparent from the following description and claims taken in connection with the accompanying drawing, forming a part of this application, in which:

Fig. 1 is a front view of a refrigerator embodying my invention;

Fig. 2 is a sectional view of a control mechanism illustrating one embodiment of my invention;

Fig. 3 is a sectional view of a control mechanism with the heater shown in Fig. 2 disposed outside the hermetically-sealed control casing;

Fig. 4 is a schematic wiring diagram showing one manner in which the control mechanisms shown in Figs. 2 and 3 may be connected to the motor of the refrigerator;

Fig. 5 is a schematic wiring diagram showing another connection for the control mechanisms shown in Figs. 2 and 3; and, Fig. 6 is an enlarged view of a device for manually adjusting the control mechanisms shown in Figs. 2 and 3.

Referring specifically to the drawing for a detailed description of my invention, numeral 11 designates a heat insulated refrigerator cabinet divided into a food compartment 12 and a machinery compartment 13. A compressor 14, a motor 15 for driving the compressor and a condenser 16 cooled by a fan 17 are disposed in the machinery compartment 13. An evaporator 18 is disposed in the food compartment 12. Condensed refrigerant is delivered to the evaporator 18 from the condenser 16 through a restricting device, herein shown as a capillary tube 19, and vaporized refrigerant is returned from the evaporator 18 to the compressor 14 through a suction conduit 21.

A hermetically-sealed control mechanism, generally indicated at 22 and constructed and arranged in accordance with my invention, is disposed in heat exchange relation with the evaporator 18, a piece of heat insulation 23 being disposed between the control mechanism and the evaporator as shown in Figs. 2 and 3. The heat insulation 23 performs a function to be hereinafter described. Referring now to Fig. 2, the control mechanism 22 embodies a crinkled bimetal disc 25 enclosed in a heat-conducting casing 26. The casing 26 is formed of a cup-shaped shell 27 hermetically sealed by a cap 28 which is preferably welded into the shell 27. A cover 29 is also attached to the shell 27 and a lead-in cable 31 extends therethrough.

The bimetal disc 25 actuates a main switch-operating member 32, a spring 33 functioning to bias the switch-operating member 32 toward the closed position of the switch mechanism, as shown in Fig. 2. A stationary contact 34 is provided within the casing 26 and a movable contact 35 cooperates therewith to close and open an electrical circuit. The movable contact 35 is mounted on a spring 36 which is biased toward contact closing position and engages at all times with a shoulder 37 provided on the main switch-operating member 32. In the embodiment shown in Fig. 2, a heater coil 30 having lagging 30a, is enclosed within the casing 26 for a purpose hereinafter described. Gas-tight lead-in seals 38 and 39 are provided in the cap 28 for conductors 41 and 42 leading to the contacts 35 and 34, respectively, the spring 36 being utilized to conduct current from the conductor 41 to the movable contact 35. Gas-tight lead-in seals 40 and 40a are provided for conductors 43 and 44, respectively, for energizing the heater coil 30.

The control mechanism 22 is provided with an evaporator temperature differential adjustment 45 and an evaporator temperature range adjustment 46, both being adjustable from outside the hermetically-sealed portion of casing 22. These adjustments are usually made in the factory or by a field service man and are not intended to be changed by the user of the refrigerator, other means to be presently described being provided for the user to adjust the evaporator temperatures at which the contacts 34 and 35 open and close.

Referring now to Fig. 3, the control mechanism illustrated is the same as that shown in Fig. 2 except that the heater coil 30 is disposed outside the heat conducting casing 26 and is provided with electrical energy through conductors 52 and 53. The residual heat stored by lagging 30a in Fig. 2 is stored by the casing 22 and by the mass of the heater in the device shown in Fig. 3.

*Description of Fig. 4*

Fig. 4 illustrates one manner of connecting the control mechanism shown in Figs. 2 or 3 to the motor 15 to control the operation thereof and, therefore, the temperature of the evaporator 18. The motor 15 is connected directly to one side of the line L₁ and is connected to a contact 54 of a manually adjustable controller, generally indicated at 50, by conductors 55 and 56. The motor is also connected to the movable contact 35 of the control device 22 through conductors 55, 57 and 41 and the stationary contact 34 of the control device 22 is connected to a contact 58 of the controller 50 by conductors 59 and 42.

A third contact 60 is connected to one side of the heater coil 30 by conductors 61 and 43 and the other side of the heater coil is connected to the conductor L₁ by conductors 44 and 62. Still another contact 63 is connected to one side of a resistor 64 by a conductor 65. A conductor 66 connects the other side of the resistor to the conductor 61 extending between contact 60 and heater 30. A fan-shaped contact member 67 of sufficient size to bridge all the contact members 54, 58, 60 and 63, at one time when desired, is connected by a shaft 68 to a manually-operated dial 69 shown disposed above the food storage compartment 12 in Fig. 1. The contactor 67 is electrically connected to the other side of the line L₂. The connections for the motor 15 and control device 22 disclosed in Fig. 4 provides no compensation for changes in refrigeration load or for changes in ambient temperature surrounding the refrigerator cabinet 11.

*Operation of Fig. 4*

The operation of the refrigerator when the parts are connected as shown in Fig. 4 is as follows: In the position shown in the drawings in Fig. 4 the refrigerating mechanism is not operating, the dial 69 being disposed in the "off" position. If the dial 69 is now turned to the "warm" position, which may be an evaporator defrosting position, and the contacts 34 and 35 are closed by the bi-metal disc being heated to the temperature where it snaps to the position shown in Figs. 2 and 3, an electrical circuit is established as follows: From line L₁ through motor 15, conductors 55, 57 and 59 to contact 58, and through contactor 67 to the other side of the line L₂.

Under such conditions, the motor runs and drives the compressor 14 to circulate refrigerant through the evaporator until the evaporator temperature is reduced to the temperature at which the bimetal disc 25 snaps and opens the contacts 34 and 35. The only heat which is imparted to the disc 25 comes from the air and materials stored in the food storage compartment 12 so that a considerable time will elapse before the disc 25 is heated sufficiently to again snap to the position shown in Figs. 2 and 3 and reestablish the circuit described. Accordingly, at this time, the mean temperature of the air in the chamber 12 is relatively high.

If the knob 69 is now moved to the "cool" position the contactor 67 engages both contacts 58 and 63 and if the contacts 34 and 35 are closed because of a demand for refrigeration, a circuit is established from line L₁ through motor 15, conductors 55 and 57 and 59 to contact 58 and through contactor 67 to line L₂. A circuit is also established, whether main contacts 34 and 35 are closed or open, from line L₁ through conductor 62, heater 30, conductor 61 and 66 to resistance 64, conductor 65 to contact 63 and through contactor 67 to the other side of the line L₂.

Under such conditions the heater 30 is energized, but because of the resistance 64 in series, the heater does not generate its maximum heat. The heater 30 imparts heat to the bimetal disc 25 so that the main contacts 34 and 35 remain closed longer and the temperature of the evaporator 18 at which the disc 25 snaps contacts 34 and 35 open is lowered. Thus the cut-off temperature is lowered. However, when the evaporator has been cooled to the temperature at which the disc 25 opens the contacts 34 and 35, the heater 30 is still energized and heats up the disc 25 faster than when the knob 69 is in the "warm" position, thus effecting closing of the contacts 34 and 35 and operation of the motor 15 sooner. Thus the cut-on temperature is also lowered. This produces more refrigeration and lowers the mean operating temperature of the evaporator 18, both the upper and lower temperature limits of the evaporator being lower.

If the knob 69 is now turned to the "cold" position the contactor 67 bridges contacts 58, 63, and 60 and the following circuits are established: First a circuit between lines L₁ and L₂ through the motor 15 is established as explained heretofore, if the contacts 34 and 35 are closed in response to a demand for refrigeration. Secondly, a circuit is established from line L1 through conductor 62, heater 30, conductor 61 to contact 60 and through contactor 67 to the other side of the line L2.

Under these conditions the heater is heated by full line potential and generates more heat than when the resistor 64 is in series. The heater 30, therefore, keeps contacts 34 and 35 closed longer. When the evaporator is cooled sufficiently to cause the disc 25 to open the contacts 34 and 35, the heater 30 is still energized and it heats the disc 25 quickly to snap it to the position shown in Figs. 2 and 3 and close the contacts 34 and 35. Therefore, the mean evaporator temperature is lower than the other positions of the contactor 67 described, both the upper and lower temperature limits being lowered.

For continuous running of the motor 15 and compressor 14 the knob 69 is moved to the "continuous" position and the contacts 34 and 35 are shunted out, a circuit being established from line L1 through motor 15, conductors 55 and 56 to contact 54, through contactor 67 and to the other side of the line L2. At this position the motor and compressor will operate continuously regardless of whether the contacts 34 and 35 are open or closed.

While five operating positions have been illustrated, it is obvious that as many positions as desired may be utilized by changing the amount of heat generated by the heater 30. Also it is noted that in this embodiment of my invention the heat lagging 23 retards the flow of heat between the casing 27 and the evaporator 18 and permits the use of a small heater which quickly reacts upon the bimetal disc 25 even though it generates but small amounts of heat. This has advantages in savings in the cost of the heater and the current it consumes as well as minimizing the amount of heat radiated to the food storage compartment 12.

*Description of Fig. 5*

Fig. 5 illustrates a second embodiment of my invention wherein the control mechanisms shown in Figs. 2 and 3 are connected to provide for temperature compensation, that is to compensate for changes in refrigeration load or in temperatures outside the refrigerator cabinet so as to maintain a substantially constant pre-selected temperature in the storage compartment 12.

In Fig. 5, the controller 50 is again shown with the knob 69 in the "off" position and the contactor 67, therefore, out of engagement with any of the contacts of the controller device 50. In this embodiment, the controller device 50 is again provided with four contacts 71, 72, 73 and 74.

*Operation of Fig. 5*

Assume now that the knob 69 is moved to the "warm" position and the contacts 34 and 35 have been closed by the bimetal disc 25. The contactor 67 engages with the contact 71 and a circuit is established from line L3 across the contacts 34 and 35, through a conductor 76 to contact 71, through contactor 50, and conductor 77 to motor 15 and to line L4. In this position the operation of the refrigerator is the same as that described when contactor 67 engages contact 58 in Fig. 4, and there is no temperature compensation. In other words, the bimetal disc 25 is snapped to its closed position by heat from the foot storage compartment 12 and evaporator 18, which heat transfer is relatively slow and the evaporator, therefore, operates at a relatively high temperature. This temperature, for example, may be a defrosting temperature and temperature compensation during such operation is not necessary.

If the knob 69 is now moved to the "cool" position, and the contacts 34 and 35 are closed, the contactor 67 engages contacts 71 and 72 and the following circuits are established: First the same circuit described above is established from line L3, L4 through contact 71 and motor 15. A second circuit is established from line L3 through contacts 34 and 35, conductor 76 to contact 71 through contactor 67 to contact 72, through conductor 78, resistor 79, conductors 81, 82 to heater 30 and from heater 30 through conductor 83 to line L4.

The heater 30 is, therefore, energized at less than full line voltage and is only energized when main contacts 34 and 35 are closed and motor 15 is energized. Heater 30 heats the bimetal disc 25 and maintains the contacts 34 and 35 in their closed position for a longer time than when no heat is imparted to the disc by a heater. The evaporator temperature at which the main contacts 34 and 35 open and stop the motor and compressor is, therefore, lower. Thus the cut-off temperature is lower.

Compensation for changes in refrigeration load in the food storage compartment 12 or in ambient temperatures is effected because more or less heat is present to be absorbed by the evaporator 18 and the motor 15 therefore runs longer or shorter periods of time. The heater 30 is energized for longer or shorter periods corresponding to motor energization so that the total heat generated by the heater 30 is varied, thus varying the residual heat contained in the lagging 30a in Fig. 2 or lagging 22 and the mass of the heater 30 in Fig. 3. The contacts 34 and 35 are therefore held closed for longer or shorter periods because the residual heat in the lagging is imparted to the disc 25 thereby maintaining a more constant food storage compartment temperature.

If the control knob 69 is now moved to the "cold" position and the contacts 34 and 35 are closed in response to a demand for refrigeration, the contactor 67 bridges contacts 71, 72 and 73 and the following circuits are established: A circuit from line L3 through motor 15 to line L4 is established as in the other positions. A second circuit is established from line L3 through the main contacts 34 and 35 and conductor 76 to contact 71, across the contactor 67 to contact 73, through conductor 82 to heater 30 and from heater 30 through conductor 83 to line L4. Full line voltage, therefore, energizes the heater 30 which generates more heat than when resistor 79 is in the circuit, thereby maintaining the contacts 34 and 35 in their closed position longer and lowering the temperature of the evaporator 18 at which the main contacts 34 and 35 open. Thus the cut-off temperature is still lower. Compensation for changes in load is effected in the same manner as explained hereinbefore, the heater 30 generating more or less heat as refrigeration load changes.

By utilizing the heat lagging 23 between the casing 27 of the control mechanism 22 and the evaporator 18, a smaller heater may be used as explained with respect to the embodiment shown in Fig. 4. In addition, when the heater 30 is deenergized when the motor is stopped, the heat lagging 30a in Fig. 2, or the casing 22 and mass of the heater in Fig. 3, impart more or less residual heat to the disc 25 depending on the length of time the heater 30 has been energized, thus varying the evaporator temperature at which the disc 25 snaps to the "on" position. For example, if the heater 30 has been energized for a relatively long period of time because of heavy refrigeration load, and the disc 25 has snapped to open the contacts, the disc will absorb residual heat and snap to close the contacts at a lower evaporator temperature than normally. It is clear, therefore, that both the upper and lower temperature limits of the evaporator are changed, when the knob 69 is moved to either the "cool" or "cold" positions, and that both limits are also changed when refrigerator load changes, whereby closer temperature compensation is obtained.

If the knob 69 is now moved to the "continuous" position, the contactor 67 bridges all contacts 71, 72, 73 and 74 and the main contacts 34 and 35, are shunted out. Under these conditions a circuit is established from line L3 through conductor 84 to contact 74, through contactor 67 and conductor 77 to the motor 15 and to line L4. Regardless of whether main contacts 34 and 35 are open or closed the motor 15 operates compressor 14 continuously. It is obvious that further positions of adjustment may be added if desired by changing the energization of heater 30.

From the foregoing it will be apparent that I have provided a new and improved hermetically-sealed control device of the temperature-responsive-metal type and have provided for improved control and operation of a refrigerator mechanism.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In refrigerating apparatus, the combination of an evaporator, a compressor for circulating refrigerant through the evaporator, a motor for driving the compressor, a switch for controlling the operation of the motor, a thermostatic element in heat exchange relation with said evaporator for opening and closing said switch at predetermined low and high temperatures, and means for varying the temperatures at which said thermostatic element opens and closes, said means including an electrical heater in heat exchange relation with said thermostatic element and a single manually operable member for controlling said heater and said motor to provide continuous operation of the motor, complete deenergization of said motor, or automatic cyclic operation of said motor in response to one or more pre-selected mean evaporator temperatures.

2. In refrigerating apparatus, the combination of an evaporator, a compressor for circulating refrigerant through the evaporator, a motor for driving the compressor, a switch for controlling the operation of the motor, a thermostatic element formed of temperature-responsive metal disposed in heat exchange relation with said evaporator for opening and closing said switch at predetermined low and high temperatures, respectively, a hermetically-sealed casing for housing said thermostatic element and means for varying the temperatures at which said thermostatic element opens and closes, said means including an electrical heater in heat exchange relation with said thermostatic element and a single manually operable member for controlling said heater and said motor to provide continuous operation of the motor, complete deenergization of said motor, or automatic cyclic operation of said motor in response to one or more pre-selected mean evaporator temperatures.

3. In refrigerating apparatus, the combination of an evaporator, a compressor for circulating refrigerant through the evaporator, a motor for driving the compressor, a switch for controlling the operation of the motor, a thermostatic element formed of temperature-responsive metal disposed in heat exchange relation with said evaporator for opening and closing said switch at predetermined low and high temperatures, respectively, a hermetically-sealed casing for housing said thermostatic element and means for varying the temperatures at which said thermostatic element opens and closes, said means including an electrical heater in heat exchange relation with said thermostatic element and a single manually operable member for controlling said heater and said motor to provide continuous operation of the motor, complete deenergization of said motor, or automatic cyclic operation of said motor in response to one or more pre-selected mean evaporator temperatures, said electric heater also being disposed in said hermetically-sealed casing.

4. In refrigerating apparatus, the combination of an evaporator, a compressor for circulating refrigerant through the evaporator, a motor for driving the compressor, a switch for controlling the operation of the motor, a thermostatic element in heat exchange relation with the evaporator for opening and closing said switch at predetermined low and high temperatures respectively, and means for varying the temperatures at which said thermostatic element opens and closes said switch including an electrical heater in heat exchange relation with said thermostatic element and a manual adjustment for imparting different degrees of heat to said heater to vary the temperatures at which said thermostat operates said switch, said heater also being electrically connected to said motor so that the total heat output of said heater is varied by the operation of the motor and thereby compensates for different refrigerating loads.

5. In refrigerating apparatus, the combination of an evaporator, a compressor for circulating refrigerant through the evaporator, a motor for driving the compressor, a switch for controlling the operation of the motor, a thermostatic element in heat exchange relation with the evaporator for opening and closing said switch at predetermined low and high temperatures respectively, and means for varying the temperatures at which said thermostatic element opens and closes said switch including an electrical heater in heat exchange relation with said thermostatic element and a manual adjustment for varying the amount of heat generated by said heater to vary the temperatures at which said thermostatic element operates said switch, said heater also being electrically connected to said motor so that the total heat output of said heater is varied by the operation of the motor and thereby compensates for different refrigerating loads, said electrical heater being so connected to said motor that it is energized only when the motor is operating.

6. In refrigerating apparatus, the combination of an evaporator, a compressor for circulating refrigerant through said evaporator, a motor for driving the compressor, a heater element connected to said motor in such a manner that the heater is energized only when said motor is operating, means independent of said motor for adjusting the heat output of said heater, so that the total heat output thereof is determined by the load on said motor and the setting of said adjusting means, a switch for controlling the operation of said motor and a thermostatic element formed of heat responsive metal disposed in heat exchange relation with said evaporator for opening and closing the switch at predetermined low and high temperatures, respectively, said heater being disposed in heat exchanging relation with said thermostatic element to vary the temperatures at which the thermostatic element operates the switch, said adjusting means embodying a controller connected electrically to said heater and said motor to provide for continuous operation of the motor, complete deenergization of the motor, or automatic cyclic operation of said motor in response to one or more pre-selected mean evaporator temperatures, and a single manually operable element for setting said controller.

7. In refrigerating apparatus, the combination of an evaporator, a compressor for circulating refrigerant through said evaporator, a motor embodying motor windings for driving the compressor, a heater element connected to said motor windings in such a manner that the heater is energized only when said motor is operating, means independent of said motor for adjusting the heat output of said heater, so that the total heat output thereof is determined by the load on said motor and the setting of said adjusting means, a switch for controlling the operation of said motor and a thermostatic element formed of heat responsive metal disposed in heat exchange relation with said evaporator for opening and closing the switch at predetermined low and high temperatures, respectively, said heater being disposed in heat exchanging relation with said thermostatic element to vary the temperatures of the evaporator at which the thermostatic element operates the switch, said adjusting means embodying a controller connected electrically to said heater and said motor to provide for continuous operation of the motor, complete deenergization of the motor, or automatic cyclic operation of said motor in response to one or more pre-selected mean evaporator temperatures.

8. In refrigerating apparatus, the combination of an evaporator, a compressor for circulating refrigerant through said evaporator, a motor for driving the compressor, a heater element connected to said motor in such a manner that the heater is energized only when said motor is operating, means independent of said motor for adjusting the heat output of said heater, so that the total heat output thereof is determined by the load on said motor and the setting of said adjusting means, a switch for controlling the operation of said motor and a thermostatic element formed of heat responsive metal disposed in heat exchange relation with said evaporator for opening and closing the switch at predetermined low and high temperatures, respectively, said heater being disposed in heat exchanging relation with said thermostatic element to vary the temperatures at which the thermostatic element operates the switch, said thermostatic element and heater being insulated from said evaporator so that less heat is required to operate the thermostatic element and so that the cut-on temperature of the thermostatic element is lowered as more heat is produced by the heater because appreciable residual heat thereof is imparted to the thermostatic element after it has opened the switch.

9. In a thermostatic switch structure for controlling the operation of a refrigerator including a refrigerated cabinet and a refrigerating system, said refrigerating system including an evaporator disposed in the refrigerated cabinet, the combination of a switch, temperature-responsive means for actuating the switch, a separate means for modifying the action of the temperature-responsive means, a single manually operable member for controlling said modifying means to provide continuous operation of the system, complete inactivity of the system or automatic cyclic operation of the system in response to one or more preselected mean evaporator temperatures, and means for retaining the switch, temperature-responsive means and modifying means in closely spaced operative relation as a single package within the refrigerated cabinet.

10. In a thermostatic switch structure for controlling the operation of a refrigerator including a refrigerated cabinet and a refrigerating system, said refrigerating system including a motor for operating the system and an evaporator disposed in the refrigerated cabinet, the power input to said motor varying with the load on the refrigerating system, the combination of a switch, temperature-responsive means for actuating the switch, a separate means for modifying the action of the temperature-responsive means, said modifying means including an electrical heater in heat exchange relation with the temperature-responsive means and a manual adjustment for imparting different degrees of heat to said heater to vary the temperatures at which said temperature-responsive means operates said switch, said heater also being electrically connected to said motor so that the total heat output of said heater is varied by and during operation of the motor and thereby compensates for different refrigerating loads, and means for retaining the switch, temperature-responsive means and modifying means in closely spaced operable relation as a single package within the refrigerated cabinet.

MILTON KALISCHER.